UNITED STATES PATENT OFFICE.

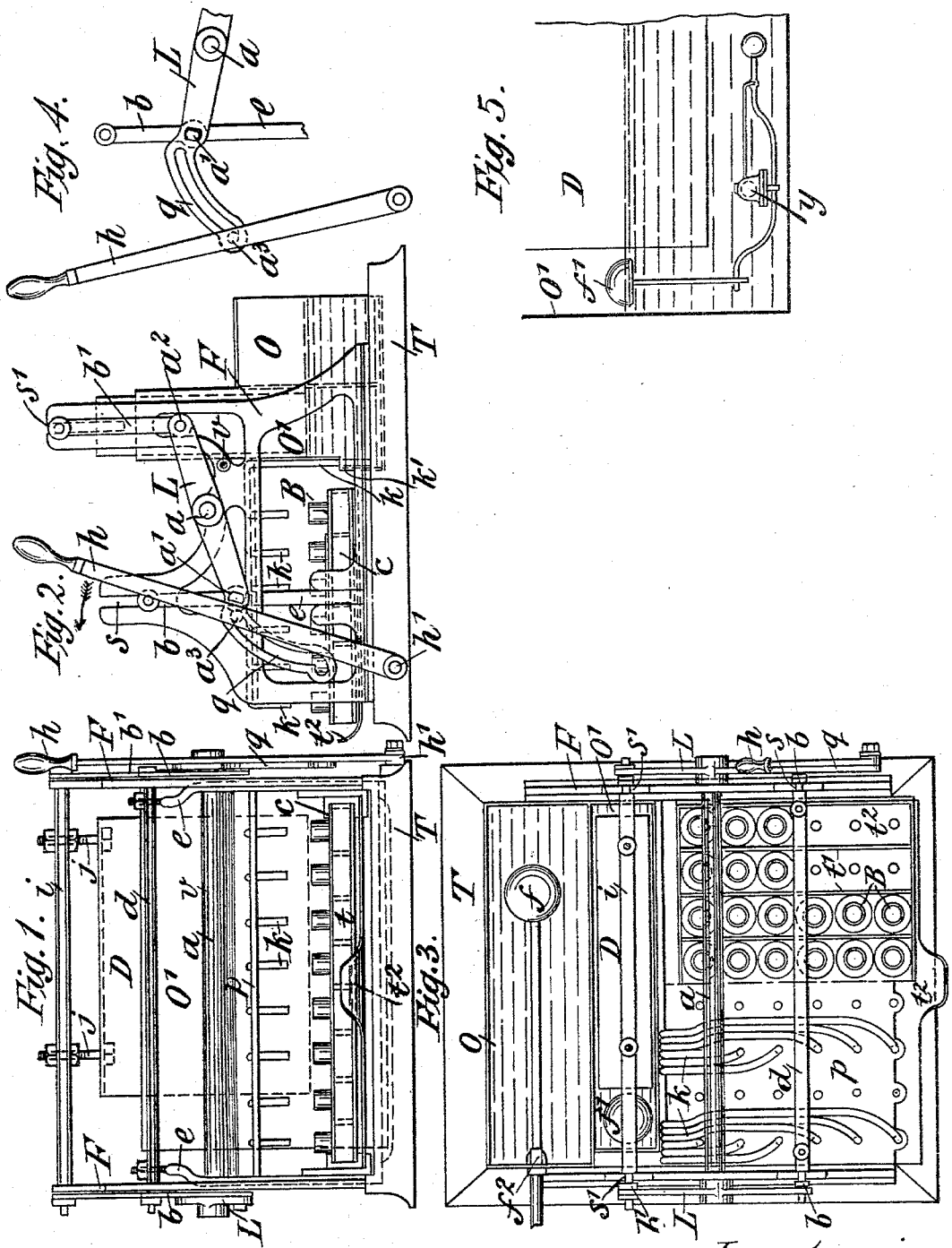

WILLIAM ALEXANDER BOWIE, OF LONDON, AND ERNEST JAMES DODD, OF NEW BARNET, ENGLAND.

MACHINE FOR FILLING BOTTLES.

SPECIFICATION forming part of Letters Patent No. 552,983, dated January 14, 1896.

Application filed December 11, 1894. Serial No. 531,515. (No model.) Patented in England March 8, 1893, No. 5,066.

*To all whom it may concern:*

Be it known that we, WILLIAM ALEXANDER BOWIE, residing at 14 Tierney Road, Streatham Hill, London, in the county of Surrey, and ERNEST JAMES DODD, residing at 2 Eveline Villas, Leicester Road, New Barnet, in the county of Hertford, England, subjects of the Queen of Great Britain and Ireland, have invented a certain new and useful Machine for Filling Bottles and other Similar Receptacles with Liquids, (for which we have obtained a patent in Great Britain, No. 5,066, bearing date March 8, 1893,) of which the following is a specification.

Our invention relates to a new or improved machine for filling bottles and other receptacles, and has for its object to fill up to a fixed and uniform level any number of bottles, whatever may be their size, contents or depth.

Figure 1 is a front elevation. Fig. 2 is a side view, and Fig. 3 a plan, of our improved machine. Figs. 4 and 5 are details of the same.

The machine consists of a bed-plate T carrying two side frames F connected together by a tie-rod $v$, Fig. 2, and by the axis $a$ and to which is suspended by the bars $b$, $b'$ and $d$ a carrier $c$ designed to receive a tray containing the bottles B required to be filled and furnished with fixed or removable dividing bars or partitions $t'$, this tray sliding between grooves formed in the inner sides of the carrier $c$, Fig. 1, and being provided with a perforated removable false bottom $t^2$.

At the back of the machine is arranged a tank divided into two communicating parts O and O' each of which is provided with a ball-valve. In the part or tank O' is arranged a weighted body D, which we call a "displacer," and which is connected at the top to a horizontal bar $i$ by means of two screw-rods $j$ passing through the said bar and secured thereto by nuts, so as to permit the depth of the displacer in the compartment O' of the tank to be properly regulated. The horizontal bar $i$ is terminated at each end with a screw-threaded journal passing through the slots $s'$ of the rear uprights of the frame F and secured to the two bars $b'$ by nuts or otherwise. Along the front wall of the tank ascend a row of siphon-pipes $k$, the lower ends of which pass through an extension $k'$ of the tank in order to dip in the liquid at the bottom thereof, while their upper ends are bent over the inner edge of the plate $p$ and extend across this plate in order to pass subsequently through corresponding perforations of the said plate and supply each bottle in the tray below with the necessary layer of liquid required, which liquid is delivered by a supply-cock $f^2$, actuated by the ball or float $f$.

Fig. 3 shows the plate $p$ on the left-hand side only, one-half of this plate having been removed on the right-hand side in order to show the tray $t$ below filled with bottles B. The carrier is suspended by the bars $e$ to an upper horizontal bar $d$, terminated at each end by a screw-threaded journal passing through the slots $s$ of the front uprights of the frame F, and secured to outer vertical bars $b$ by nuts or pins. The bars $e$ terminate at the top with screw-rods passing through openings in the bar $d$ and secured thereto by nuts so that the height of the carrier can be adjusted according to requirements. Upon each extremity of the axis $a$ is fulcrumed a lever L, one end of each of which is fixed to the bars $b'$ and the other to the bars $b$. One of these levers L carries or is formed with a slotted tailpiece $q$, wherein moves a pin $a^3$ attached to a hand-lever $h$, pivoted at its lower end $h'$ to a pin fixed to the side of the bed-plate T of the machine.

Fig. 2 shows the position of the parts of the machine before filling. In order to fill the bottles B in the tray, the lever $h$ is moved in the direction of the arrow, Fig. 2, and raises, by the aid of the pin $a^3$ traveling along the slot, the tail $q$ and the end $a'$ of the lever L while its other end $a^2$ is simultaneously lowered. This causes the tray $t$ in front to be raised sufficiently to allow of the lower ends of the pipes $k$ entering the mouths of the bottles B on the said tray, while at the same time the displacer D, bearing on the liquid at the bottom of the tank O', forces the same to ascend through the siphon-pipes $k$ and to fill the bottles up to a uniform level which depends upon the adjustment of the displacer, the level of the liquid displaced being raised so as to cause it to start the flow through the said siphon-tubes and then by the filling of the bottles to gradually fall to the desired level corresponding with that in the bottles. The filling of the bottles consequently continues until the level of the liquid is the same in the bottles as in the tank O'. As soon as this level is reached the flow of liquid ceases, and the lever $h$ being brought back into its original position the tray is lowered in order to be emptied of the filled bottles by removing its false bottom $l^2$ and to be filled with empty bottles, the displacer meanwhile being raised out of contact with the liquid in the tank O' and ceasing to act thereon.

Fig. 4 shows a separate view of the lever $h$, tail $q$ and lever L in the reverse position to that shown in Fig. 2—that is, when the carrier $c$ is raised.

Fig. 7 is a separate view of the ball or float $f'$ and the valve $y$ connecting the tanks O O' together for feeding the tank O' with liquid to a certain depth and preventing the displacer D forcing the said liquid back into the tank or compartment O.

Having now described our invention, what we claim, and desire to secure by Letters Patent, is—

1. A bottle filling machine comprising a bed plate T frames F. F., pivoted levers L. L, bars $b$. $b'$, carrier $c$, horizontal bars $d$, $i$, displacer D and adjustable suspension bars $e$ $e$, substantially as described and set forth.

2. In a bottle filling machine the combination of the levers L L the slotted tail piece $q$ and the pin $a^2$ in gear therewith carried by the operating handle $h$ the displacer D and means for filling the bottles substantially as described and for the purpose set forth.

3. In a bottle filling machine the combination of the carrier $c$ the bars $d$ and $e$, the pivoted levers L L tail piece $q$, pin $a^3$, lever $h$ the displacer D and means for filling the bottles substantially as described and for the purpose set forth.

4. In a bottle filling machine the means for filling the bottles comprising the tanks O O' fitted with ball valves $f^2$ and $y$, the siphon pipes $k$ carried by the plate $p$, the displacer D adjustably suspended to the bar $i$ the bars $b$ $b'$ connected to the pivoted levers L L the tail piece $q$, pin $a^3$ and lever $h$ substantially as described and for the purposes set forth.

WILLIAM ALEXANDER BOWIE.
ERNEST JAMES DODD.

Witnesses:
WILLIAM CURTAYNE,
JOHN BEACH FLEURET.